Feb. 22, 1927.

L. P. ROGERS 1,618,355

DIMMER CONTROL FOR HEADLIGHTS

Filed Jan. 15, 1926

Inventor

Loyd P. Rogers

By Lynn H. Latta - Atty.

Patented Feb. 22, 1927.

1,618,355

UNITED STATES PATENT OFFICE.

LOYD P. ROGERS, OF SOUTH SIOUX CITY, NEBRASKA.

DIMMER CONTROL FOR HEADLIGHTS.

Application filed January 15, 1926. Serial No. 81,468.

My invention relates to an auxiliary control device for automobile headlight circuits, and has for its object to provide means whereby the headlights may be dimmed by pressure from the foot or knee of the operator upon a pedal.

Another object of my invention is to provide a device which is of simple, durable and inexpensive construction.

More specifically, it is my object to provide in combination with the usual headlight circuit an auxiliary circuit embodied in the device which may be readily attached to the footboards or body of a car, convenient to the pedal extremity of the operator, and including a spring-urged cantilever switch, a resistance coil thrown into the auxiliary circuit in series therewith by pedal depression of the switch against its spring pressure, and released from said auxiliary circuit by release of such pedal pressure, and a shunt normally completing the auxiliary circuit across said coil, but released from the circuit by pedal depression of the switch.

With these and other objects in view, my invention consists in the construction, arrangement and combination of the various parts of my device, whereby the objects contemplated are attained, as hereinafter more fully set forth, pointed out in my claim and illustrated in the accompanying drawings, in which:

Figure 5:
Figure 3:
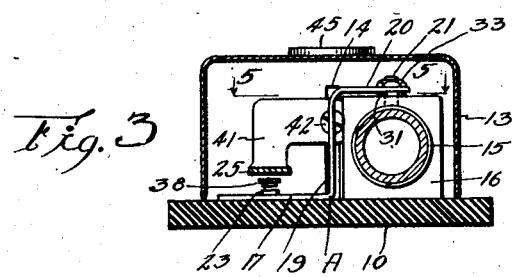
Fig. 3 is a transverse sectional view, taken on the line 3—3 of Fig. 2.
Figure 4:
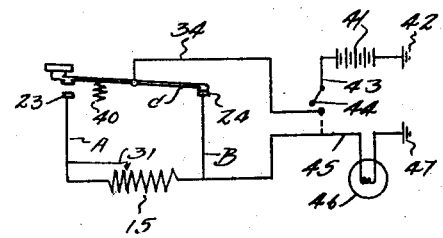

Fig. 4 is a diagram illustrating the connection of the auxiliary circuit embodied in the device with the ordinary headlight circuit, and Fig. 5 is a detail sectional view, taken on the line 5—5 of Fig. 3.

The ordinary automobile provides for dimming of its headlights by the use of a resistance coil thrown into and out of the circuit by means of a switch lever mounted on the dash of the car. However, it often happens that the driver's hand is not free to operate the switch, and such a switch has been found to be so inconvenient that in a majority of cases where two automobiles are approaching each other the drivers do not take the trouble to dim their headlights.

My invention embodies the use of an auxiliary dimming attachment which may be operated by pressure from the foot of the driver to throw into the circuit a resistance coil, and for automatically releasing the same from the circuit when the pressure of the foot is released from the pedal of the device.

It further contemplates a dimming device of compact construction which may be located either on the floorboards or the side of the car in position where the foot or knee, respectively, may be used to operate the device.

In the drawings I have shown a base, 10, of insulating material such as fiber or the like, having openings, 11, to receive screws or the like, by means of which the device may be fastened in position. Between the spring clips, 12, which are secured to the base, is received a metallic cover or casing, 13, having at one end a slot, 14.

A resistance coil, 15, having the end blocks, 16, of fiber or the like, is secured to the base by means of metallic yokes, A and B, each of which comprises an arm, 17, secured, as at 18, to the base, 10, and upwardly extending portion, 19, and a portion, 20, bent parallel to the base at a height such as to snugly receive the block, 16.

The free ends of the yokes, A and B, are provided with openings, not shown, which receive studs, 21 and 22, secured in the blocks, 16, and electrically connected with the respective ends of the coil, 15. The yokes are formed of spring material in order that the free ends thereof may be raised to allow insertion and removal of the coil.

Figure 2:
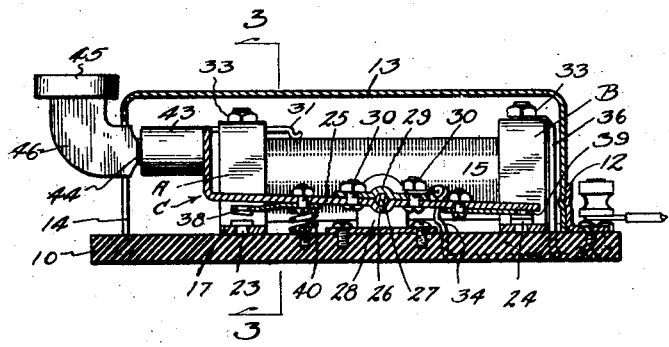
Fig. 2 is a longitudinal sectional view, taken on the line 2—2 of Fig. 1.

Between the yoke, A, and the block, 16, is received a sliding adjustment member, 31, which has the slot, 32, receiving the shank of the stud, 21, which, on that end of the coil, is squared, as shown in Fig. 5. Nuts, 33, are threaded onto the studs, 21, in order to secure a permanent electrical contact between the studs and the yokes, A and B. By loosening the nut, 33, which secures the yoke A, the adjusting member, 31, may be slid longitudinally so as to vary the contact of the same with the coil, 15. (See Fig. 2.)

The coil is wound of bare wire in order that the member, 31, may establish electrical contact between the same and the yoke, A. The member, 31, being of heavy spring brass or the like, its resistance is negligible compared with that portion of the coil which it bridges, and it thus serves by longitudinal adjustment to vary the resistance of the coil. The squared portion of the stud which it receives keeps it aligned with the coil.

Figure 1:
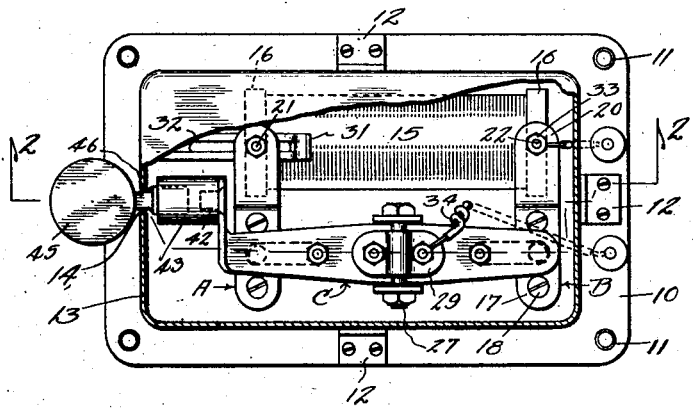
Fig. 1 is a plan view of the attachment, a portion of the casing being broken away to illustrate the interior of the device.

The portion, 17, of the yokes serve to support the contact terminals, 23 and 24, between which is pivoted a cantilever switch, C. The switch, C, comprises a metallic bar, 25, having a depressed channel, 26, midway of its ends, which receive a pedal rod, 27, supported by a bracket, 28. A cap, 29, is secured as by bolts, 30, to the bar, 25, in order to enclose the pedal, 27, and one of the bolts, 30, serves to connect a short wire, 34, to the switch. The wire is extended through the base and to a binding post, 35, as shown in Fig. 1. Another wire, 36, is secured by the nut, 33, to the yoke, B, and is likewise extended to a binding post, 37.

The switch, C, is provided with spring contact members, 38 and 39, which are positioned to engage the terminals, 23 and 24, respectively, and a spring, 40, is disposed between the switch and the base in order to urge the end of the switch carrying the contact, 39, against the terminal, 24. When the switch is in this position, the contact, 38, is disengaged from the terminal, 23.

The bar, 25, has an upwardly and laterally directed portion, 41, to which is secured, by means of a screw, 42, a block of insulating material, 43. To the end of the block, 43, is secured a threaded portion, 44, of a pedal, 45, which has a flat shank portion, 46, received in the slot, 14.

The switch and pedal are so disposed that the pedal projects somewhat above the casing and closely adjacent thereto, so that upon pressure by the foot of the operator the casing will act as a stop to limit the motion. This arrangement is of considerable importance for the reason that the pressure exerted by the foot would ordinarily be sufficient to injure the switch if the cantilever itself were to receive all of this pressure. In the case of a hand lever, the hand of the operator in manipulating the switch would be sufficiently dexterous to exert the proper amount of pressure without injuring the switch, but with the use of the foot or knee, which members are clumsy as compared with the hand, it will be seen that the switch might readily be injured without the arrangement described.

The slot, 14, prevents rotation of the pedal when the casing, 13, is in place. By removing the casing the pedal may also be removed.

In Fig. 4 I have shown portions of the ordinary headlight circuit, including a battery, 41, grounded to the frame as at 42, and connected by means of a wire, 43, to a switch, 44, the other side of which is connected by a wire, 45, to the headlights, one of which is shown at 46, and which are grounded as at 47.

In installing the device the ordinary practice is to remove the wire, 45, from its connection with the switch, 44, and to connect it to one binding post of the device. The other binding post of the device is connected by means of a suitable wire to the terminal of the switch from which the wire, 45, was removed. Thus the device is introduced in series, and when the ordinary hand switch is used to control the lights, the current will in all cases flow through the cantilever switch, C, being shunted across the coil, 15, by means of that portion of the switch extending between the wire, 34, and the contact terminal, 24, and the yoke, B. When the switch is depressed the shunt is broken and the current will flow through the wire, 34, the other half of the switch, the yoke, A, and the coil, 15. The increased resistance serves to dim the lights.

The advantage of the device lies in its ease of manipulation.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A rheostat for automobile headlights comprising a casing having a base, a pair of clips secured to said base, a resistance coil having its ends secured under said clips and having terminals connected therewith, a bar slidably mounted on one of said terminals and having an end contacting with the turns of the coil for shunting a portion of said turns and a control switch for the clip, said control switch including a lever fulcrumed between said clips, spring urged into contact with one of the clips and adapted to be pedally depressed into contact with the other clip.

Signed this 29th day of December, 1925, in Sioux City, in the county of Woodbury and State of Iowa.

LOYD P. ROGERS.